United States Patent [19]
Thundat et al.

[11] Patent Number: 6,050,722
[45] Date of Patent: Apr. 18, 2000

[54] NON-CONTACT PASSIVE TEMPERATURE MEASURING SYSTEM AND METHOD OF OPERATION USING MICRO-MECHANICAL SENSORS

[76] Inventors: Thomas G. Thundat, 616 Plainfield Rd.; Patrick I. Oden, 804-171 Olde Pioneer Trail; Panagiotis G. Datskos, 8444 Mecklenburg Ct., all of Knoxville, Tenn. 37923

[21] Appl. No.: 09/047,358

[22] Filed: Mar. 25, 1998

[51] Int. Cl.$^7$ .............................. G01J 5/00; G01B 5/00; G01N 29/12

[52] U.S. Cl. .......................... 374/121; 73/105; 73/24.01; 250/306

[58] Field of Search ................................... 374/121, 130, 374/131, 161, 129; 250/227, 306; 73/105, 24.01

[56] References Cited

U.S. PATENT DOCUMENTS

| | | | |
|---|---|---|---|
| 3,415,712 | 12/1968 | Barker, Jr. | 428/213 |
| 3,795,918 | 3/1974 | Sunderland | 356/45 |
| 3,896,309 | 7/1975 | Halsor et al. | 257/254 |
| 4,403,251 | 9/1983 | Domarenok et al. | 348/135 |
| 4,427,881 | 1/1984 | Ruell | 250/227.11 |
| 4,693,615 | 9/1987 | Kyriakis | 374/129 |
| 4,762,426 | 8/1988 | Foss | 374/130 |
| 4,821,219 | 4/1989 | Kienitz et al. | 702/99 |
| 4,840,496 | 6/1989 | Elleman et al. | 374/124 |
| 4,974,182 | 11/1990 | Tank | 702/135 |
| 5,011,295 | 4/1991 | Krishnan et al. | 374/126 |
| 5,118,200 | 6/1992 | Kirillov et al. | 374/120 |
| 5,144,833 | 9/1992 | Amer et al. | 73/105 |
| 5,171,992 | 12/1992 | Clabes et al. | 250/306 |
| 5,245,863 | 9/1993 | Kajimura et al. | 73/105 |
| 5,272,913 | 12/1993 | Toda et al. | 73/5 |
| 5,326,173 | 7/1994 | Evans et al. | 374/128 |
| 5,345,816 | 9/1994 | Clabes et al. | 438/52 |
| 5,347,226 | 9/1994 | Bachmann et al. | 324/724 |
| 5,445,008 | 8/1995 | Wachter et al. | 73/24.56 |
| 5,550,516 | 8/1996 | Burns et al. | 331/65 |
| 5,660,472 | 8/1997 | Peuse et al. | 374/128 |
| 5,696,703 | 12/1997 | Barber | 702/130 |
| 5,719,324 | 2/1998 | Thundat et al. | 73/24.01 |

OTHER PUBLICATIONS

Henkel, "Protecting Amplifiers from High–Voltage Inputs", Sensors, May, 1994, vol. 11, No. 5, pp. 8–9.

Thundat et al., "Thermal and ambient–induced deflections of scanning force microscope cantilevers", American Institute of Physics, Appl. Phys. Lett. 64 (21), May 23, 1994, pp. 2894–2896.

Gimzewski et al., "Observation of a chemical reaction using a micromechanical sensor", Chemical Physics Letters, vol. 217, No. 5.6, Jan. 28, 1994, pp. 589–594.

Dusek et al., "Responsive Gels: Volume Transitions I", Springer–Verlag.

Keyes et al., "Optical and Infrared Detectors", Springer–Verlag, 1977, pp. 71–100.

Barnes et al. "Photothermal spectroscopy with femtojoule sensitivity using a micromechanical device" Letters to Nature, vol. 372, Nov. 1994, pp. 79–81.

*Primary Examiner*—G. Bradley Bennett
*Assistant Examiner*—Gail Verbitsky
*Attorney, Agent, or Firm*—Jones & Askew, LLP

[57] ABSTRACT

A non-contact infrared thermometer measures target temperatures remotely without requiring the ratio of the target size to the target distance to the thermometer. A collection means collects and focusses target IR radiation on an IR detector. The detector measures thermal energy of the target over a spectrum using micromechanical sensors. A processor means calculates the collected thermal energy in at least two different spectral regions using a first algorithm in program form and further calculates the ratio of the thermal energy in the at least two different spectral regions to obtain the target temperature independent of the target size, distance to the target and emissivity using a second algorithm in program form.

16 Claims, 8 Drawing Sheets

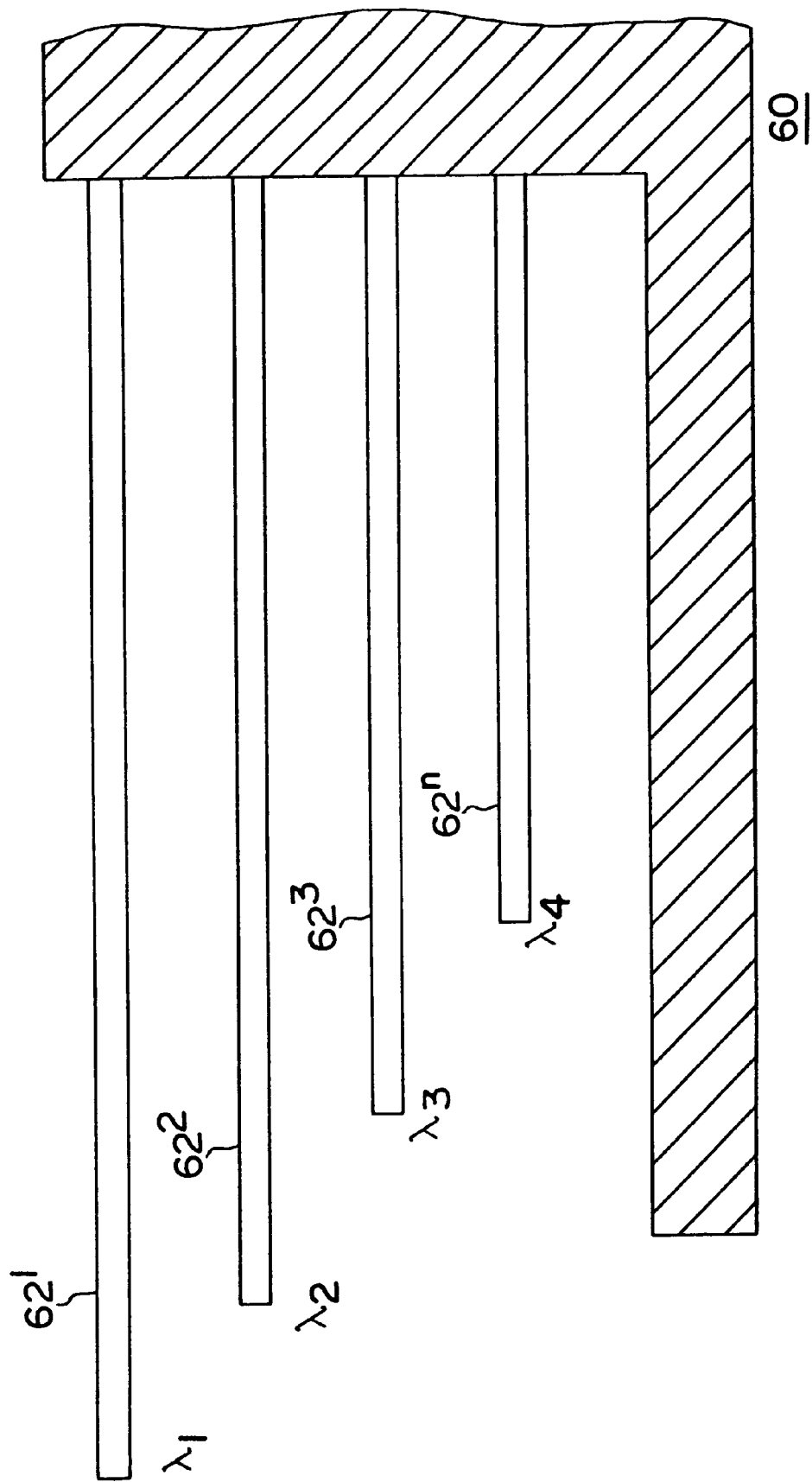

NON-CONTACT PASSIVE TEMPERATURE MEASURING SYSTEM AND METHOD OF OPERATION USING MICRO-MECHANICAL SENSORS

This invention was made with Government support under contract DE-AC0S-960R22464 awarded by the U.S. Department of Energy to Lockheed Martin Energy Research Corporation, and the Government has certain rights in this invention.

FIELD OF INVENTION

The present invention relates to thermal measuring systems and methods of operation. More particularly, the invention relates to a non-contact infrared thermometer for remote temperature measurement of a target using micro-mechanical sensors without emissivity correction.

DESCRIPTION OF THE PRIOR ART

Measuring the absolute temperature of a remote object is a challenging task. Currently available remote thermometers require the ratio of the target size to the distance from the thermometer detector to be constant and the target emissivity value, $\epsilon_T$, to be known for an accurate temperature determination. Real objects have non-uniform emissivities and targets that are good reflectors appear to be cooler than is actually the case. Therefore, a correction has to be made in order to measure the true temperature of the object. This correction limits the applicability of such detector devices to short distance or large targets with known emissivities. A need exists to overcome the problems of target size and distance and the emissivity to measure true temperatures of a remote object.

Recently, micro-mechanical sensors have found application in the measuring and testing field. In U.S. Pat. No. 5,445,008 issued Aug. 29, 1995, assigned to the same assignee as that of the present invention, apparatus and methods are described for measuring vapor concentration of a predetermined chemical or compound dispersed within a monitored atmosphere using micro-mechanical sensors. In a copending application entitled "Electromagnetic and Nuclear Radiation Detector Using Micromechanical Sensors", (Attorney Docket 2240-7141) Ser. No. 08/588,484, filed Jan. 18, 1996, assigned to the same assignee as that of the present invention, such micro-mechanical sensors are also applicable for measuring radiation. In particular, such radiation devices have been found useful for measuring black-body radiation from an object or target when the object or target temperature is different than the background temperature. In such an application, the physical parameters such as the size of the target, the distance from the thermometer, or the emissivity characteristics of the target are not required. Non-contact thermometers using micro-mechanical sensors responsive to radiation would advance the measurement of temperature of a remote object without the requirement of determining the ratio of the target size to the distance from the thermometer and the emissivity of the target. Both U.S. Pat. No. 5,445,008 and copending application Ser. No. 08/588,484, are fully incorporated herein by reference.

Prior art related to thermal measuring systems includes the following:

U.S. Pat. No. 3,795,918 issued Mar. 5, 1974, discloses a non-contact temperature measuring system independent of target emissivity based on measuring the ratio of light energy in two adjacent spectral bands. The measurement is made by means of a reference light cell and a measurement light cell switchably connected to a common amplifier chain. An electronic gain control served by the output of the reference light cell indicates the temperature of the unknown target.

U.S. Pat. No. 4,403,251 issued Sep. 6, 1983, discloses a thermovision pyrometer for measuring the temperature of an object TV camera for focusing thermal radiation. An optical switch alternately passes at least two spectral components of the radiation. The detector senses each spectral component and generates respective video signals proportional to the density of the spectral components. The synchronizing signals of the TV camera controls the optical switch and the gating circuit generates a gating marker signal which controls the position of the point of observation. The gating circuit is controlled by the TV synchronizing signal. A sampling circuit samples and measures the amplitudes of the video signal from both the TV camera and the gating circuit for determining the temperature of the object based upon the ratio of the flux densities of the respective spectral components detected at the point of observation. This ratio information is transferred to a computer via an information signal transfer switch which switches the information path between the gating circuit and a raster scanning circuit to drive a character generator which displays on a TV monitor the temperature information relative to the object under investigation.

U.S. Pat. No. 4,693,615 issued Sep. 5, 1987, discloses a method and apparatus for a non-contact temperature measurement of a static or moving target. A chopping disc is disposed in the path of radiant heat energy from the target or object, the output thereof providing a pulsed output of radiant heat energy directed toward a pyroelectric element. A rotatable disc having a pair of wavelength filters is disposed between the pyroelectric element and the chopping disc. A microprocessor operates to rotate the rotatable disc to interpose each filter in turn in the path of the pulsed output from the chopping disc at predetermined time intervals. The consequent output from the pyroelectric element after amplification, rectification and smoothing in suitable circuits is fed to the microprocessor. The processor calculates the ratio of the signal from the pyroelectric element representative of power outputs through one of the filters and the signal from the pyroelectric element representative of power output to the other filter. The ratio indicates the temperature of the hot body which is determinable without prior knowledge of the emissivity characteristics of a hot body.

U.S. Pat. No. 4,821,219 issued Apr. 11, 1989, discloses a method for measuring the temperature of a bare aluminum plate contaminated with soot distributed on different parts of the surface. Signal voltages are measured directly on the bare aluminum and on the soot. The spectral emissivities are calculated from these voltages. A two-channel pyrometer is connected by way of an analog/digital converter to a microcomputer. Corresponding values on the two spectral channels on the calculated emissivities are stored in a nonvolatile RAM. The pyrometer is calibrated using the measured voltages at a known temperature and known spectral channel. The stored emissivities and measured voltages are inserted in a formula successively for differences corresponding to different temperatures and the temperature corresponding to the closest solution of the equation is selected as the temperature of the object.

U.S. Pat. No. 4,840,496 issued Jun. 20, 1989, discloses a laser pyrometer to accurately measure a true temperature distribution on a given target without touching the target and without knowing the localizing emissivity of the target. The pyrometer is mounted in a mechanism designed to permit the pyrometer to be aimed and focused at precise localized points on the target. The pyrometer is swept over the surface area to be imaged, temperature measurements being taken at each point of focus.

U.S. Pat. No. 5,011,295 issued Apr. 30, 1991, discloses determining the thermodynamic temperature of remote objects by continuous determination of the emissivity, the reflectivity, and optical constants, as well as the apparent or brightness temperature of a sample within a single instrument. A complex polarimeter measures the emissivity reflected from the same into the detector system. The same detector is used to measure brightness temperature. The polarimeter measures both the change in polarization upon reflection as well as the degree of depolarization and hence diffuseness. The measurement enables correction for surface roughness of the sample and background radiation which could otherwise introduce errors in temperature measurement.

None of the prior art uses micromechanical sensors or array combinations to implement a non-contact thermometer for measuring temperature of a remote object regardless of object size, emissivity and distance to the thermometer.

SUMMARY OF THE INVENTION

An object of the invention is an improved non-contact passive temperature measuring system and method for remote targets independent of target size, distance, and emissivity.

Another object is an improved non-contact thermometer using micro-mechanical sensors for temperature measurement of remote objects independent of target size, distance, and emissivity.

Another object is an improved non-contact infrared thermometer with emissivity correction in measuring temperature of a remote object.

Another object is a non-contact infrared thermometer determining target temperature by calculating a ratio of thermal power in different spectral regions.

These and other objects, feature, and advantages are achieved in non-contact infrared temperature measuring system and method including an infrared thermometer which measures target temperatures remotely without requiring a ratio of the target size or the target distance to the thermometer. A collection means collects and focuses target infrared radiation on an individual or an array of micromechanical infrared detector. The detector measures thermal energy of the target over a spectrum using different sensor materials and or filters for different radiation wavelengths. A processor means calculates the collected thermal energy in at least two different spectral regions using a first algorithm and further calculates the ratio of the thermal energy in at least two different spectral regions using a second algorithm to obtain the target temperature independent of the target size, distance to the target, and emissivity. The method involves the steps of the detector absorbing a portion of a remote target thermal state and calculating the thermal power within a wavelength region $\gamma_1$ and $\gamma_2$ using a first algorithm. The thermal power is calculated for a different spectral wavelength region, $\gamma_3$ and $\gamma_4$ and a ratio of the thermal powers is determined by dividing the thermal power for the region $\gamma_1$, $\gamma_2$ by the thermal power for the region $\gamma_3$, $\gamma_4$ whereby the ratio is independent of the target size, distance, and emissivity, and is only a function of the target temperature. A unique temperature calibration curve is constructed by measuring the ratio as a function of temperature and determining the target temperature by referring to the ratio vs. temperature curve.

DESCRIPTION OF DRAWING

The invention will be further understood from the following description of a preferred embodiment taken in conjunction with the appended drawing, in which:

FIG. 4B is a representation of a stacked array of sensors for detecting different spectral regions of blackbody radiation from a remote object or target.

DESCRIPTION OF PREFERRED EMBODIMENT

Figure 1:
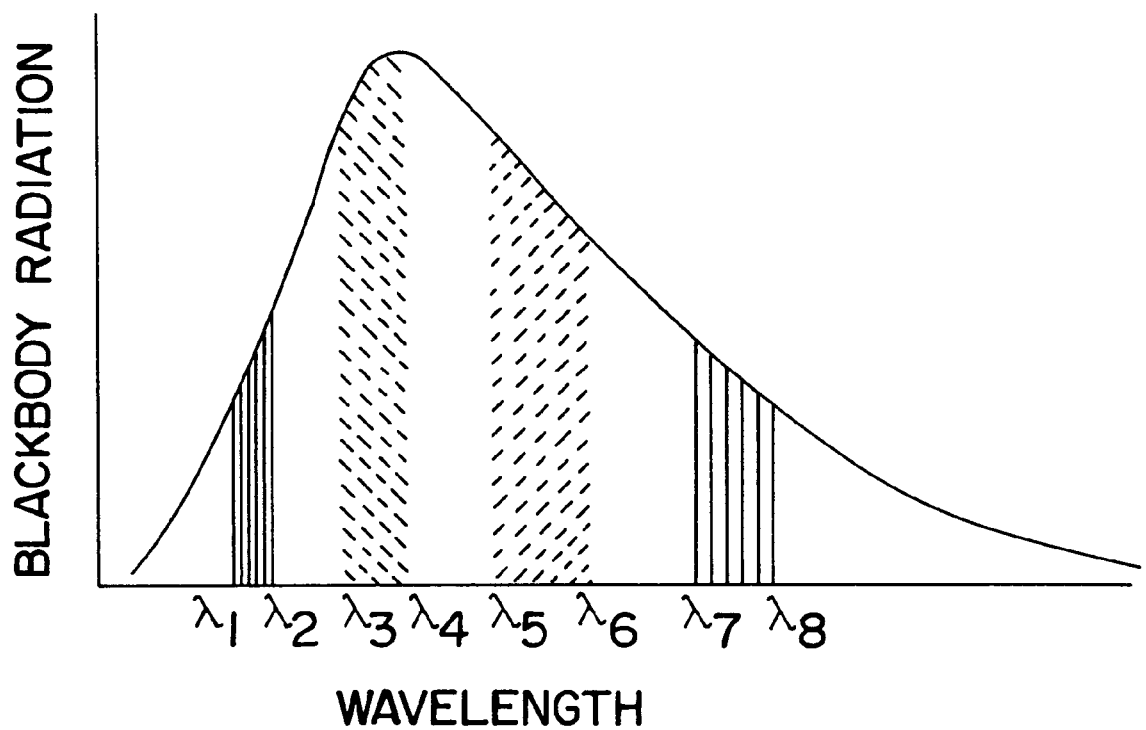
FIG. 1 is a graph of blackbody radiation in wavelengths from a remote target.

Micro cantilevers elements that are made of bimetallic or bimaterial are extremely sensitive to changes in temperature and undergo bending due to differential thermal expansions of different members of the bimaterial system. The sensitivity of a bimaterial cantilever can be increased by choosing the members of the bimaterial system such that the differential thermal expansion is optimum. This can be easily achieved by coating a silicon microcantilever with a metal overlay. Using such arrangements, temperature changes as small as $10^{-6}$° C. or heat changes as small as femto-Joule level on the microcantilever can be detected by measuring the changes in the cantilever bending. The primary advantages of the microcantilever method are sensitivity based on the ability to detect cantilever motions with subnanometer precision and their ability to be fabricated into a multi-element sensor array.

Coating one side of cantilevers with a different material, such as a metal film, makes the microcantilevers sensitive to temperature variations due to the bimetallic or bimaterial effect resulting in bending. The bending of the lever is proportional to the heat energy absorbed by the microcantilever. The maximum deflection, $Z_{max}$ due to differential stress induced by incident heat energy on the bimaterial cantilever is given by Equation (1):

$$Z_{max} = \frac{5}{4} \frac{(t_1+t_2)l_3}{(\lambda_1 t_1 + \lambda_2 t_2) w t_2^2} \cdot$$

$$\frac{(\alpha_1 - \alpha_2)(dQ/dt)}{(4(1+t_1^2)/t_2^2) + 1/t_1 t_2 (6t_1^2 + E_1 t_2^2/E_2) + E_1 t_1^3/E}$$

where dQ/dt is the incident heat energy, l and w are the length and width of the microcantilever, respectively, $t_1$, and $t_2$ are the thicknesses of the two layers, $\gamma_1$, $\gamma_2$; $\alpha_1$ $\alpha_2$; $E_1$ and $E2$ are the thermal conductivities; thermal expansion coefficients and Young's moduli of elasticity of the two layers.

In addition to bending the resonance frequency of a cantilever can also change due to changes in temperature. The resonance frequency, f, of an oscillating cantilever can be expressed as Equation (2):

$$f = \frac{1}{2\pi}\sqrt{\frac{K}{m^*}}$$

where K is the spring constant of the lever and m* is the effective mass of the microcantilever.

The spring constant of a microcantilever can also change due to changes in heat. This can be due to surface stress as in the case of bimaterial effect or changes in physical dimensions. The spring constant, σk, of the cantilever can be calculated from the bending of the cantilever, as follows as Equation (3):

$$\sum k = \pi^2 n \frac{(\sigma s_1 - \sigma s_2)}{(4n_1)}$$

where $\sigma_1$ and $\sigma_2$ are the stresses on the cantilever surfaces and n is a constant and $n_1$ is a geometrical constant.

Since the spring constant of a microcantilever is related to physical dimensions the resonance frequency can also change due to changes in dimensions. The resonance frequency of a cantilever is directly proportional to the square root of the width and cube root of the thickness. The resonance frequency vary inversely as the cube root of length. The bending of a cantilever can be measured with sub-Angstrom resolution using techniques such as changes of intensity of a reflected light using a position sensitive detector, variation in the piezoresistance of a boron implanted channel in a silicon microcantilever, changes in capacitance between microcantilever and a fixed surface, and variations in the piezoelectric voltage of piezoelectric film on a microcantilever. The need of optical set up can be eliminated by using an electrical detection scheme discussed above. The resonance frequency variation of the microcantilever can be detected using the same techniques discussed above However, measuring the absolute temperature of an object still requires emissitivity correction. Since microcantilevers are very small many cantilevers with different materials absorbing properties can be used to make a device that does not require emissitivity correction.

In FIG. 1, black-body radiation emitted at a given wavelength γ from an object is given by Planck's Equation (4):

$$dE/d\gamma = (c_1 \lambda^{-5})/(e^{hc/\lambda kt}-1)$$

where h=6.63×10$^{-34}$ j.s which is Planck's constant;
C=3.0×10$^8$ m/s is the velocity of light;
$\epsilon(\gamma)$=the spectral emissivity of the object;
T=the temperature in Kelvin;
k=1.38×10$^{-23}$ j/molecules which is Boltzman's constant The amount of power within different spectral regions can be determined to reconstruct the black-body radiation curve of the target which, in turn, allows the temperature of the target to be measured.

For a target with Area $A_t$ at a temperature T, the target's temperature can be calculated by Equation (5):

$$T_\lambda = \sqrt[4]{\frac{P_{detect}^{thermal}}{\frac{A_d A_t}{2\pi R^2} \epsilon_b \epsilon_t \epsilon_d \sigma}} + T_d$$

where:

$A_d$ is the area of the detector;
$A_t$ is the area of the target;
R is the distance between the target and the detector;
$\epsilon_b$ is the emissivity of the target background;
$\epsilon_t$ is the emissivity of the target;
$\epsilon_d$ is the emissivity of the detector; and
σ is a constant;
$T_t$ is the temperature of the target; and
$T_d$ is the temperature of the detector.

For small target temperatures ($T_t = T_d + \Delta T_d$, and small $\Delta T$) the power absorbed by the detector is given by Equation (6):

$$P_{detect} \approx A_d \frac{A_t}{2\pi R^2} \epsilon_b \epsilon_t \epsilon_d \sigma T_d^3 (T_t - T_d)$$

The target temperature can be obtained from Equation (7) as follows:

$$T_t = \frac{P_{detect}^{thermal}}{\frac{A_d A_t}{2\pi R^2} \epsilon_b \epsilon_t \epsilon_d} + T_d$$

The thermal power within a wavelength region $\gamma_1$, $\gamma_2$ absorbed by the detector is given by Equation (8):

$$P_{\lambda_1 \lambda_2}^{Thermal}(T) = \frac{A_d A_t}{2\pi R^2} \epsilon_b \epsilon_t \epsilon_d \int_{\lambda_1}^{\lambda_2} \frac{d\lambda}{\lambda^5 (e^{hc/\lambda kT} - 1)}$$

A ratio R(T) of the thermal power in two different spectral regions ($\gamma_1$, $\gamma_2$) and ($\gamma_3$, $\gamma_4$) is given by Equation (9):

$$R(T) = \frac{\int_{\lambda_1}^{\lambda_2} \frac{d\lambda}{\lambda^5 (e^{hc/\lambda kT} - 1)}}{\int_{\lambda_1}^{\lambda_2} \frac{d\lambda}{\lambda^5 (e^{hc/\lambda kT} - 1)}}$$

R(T) is independent of the target size, distance, and emissivities. R(T) is only a function of the target's temperature. The target temperature can be determined from a unique calibration curve measuring R(T) as a function of Temperature, as shown in FIG. 1. Where $R_1$, is the ratio of the waveform intensities through 3–5 micrometer bandpass filter over a 0.8 to 14 micrometer bandpass filter, $R_2$ is the ratio of an 8 to 14 micrometer bandpass filter over a 0.8 to 14 micrometer bandpass filter.

Figure 3:
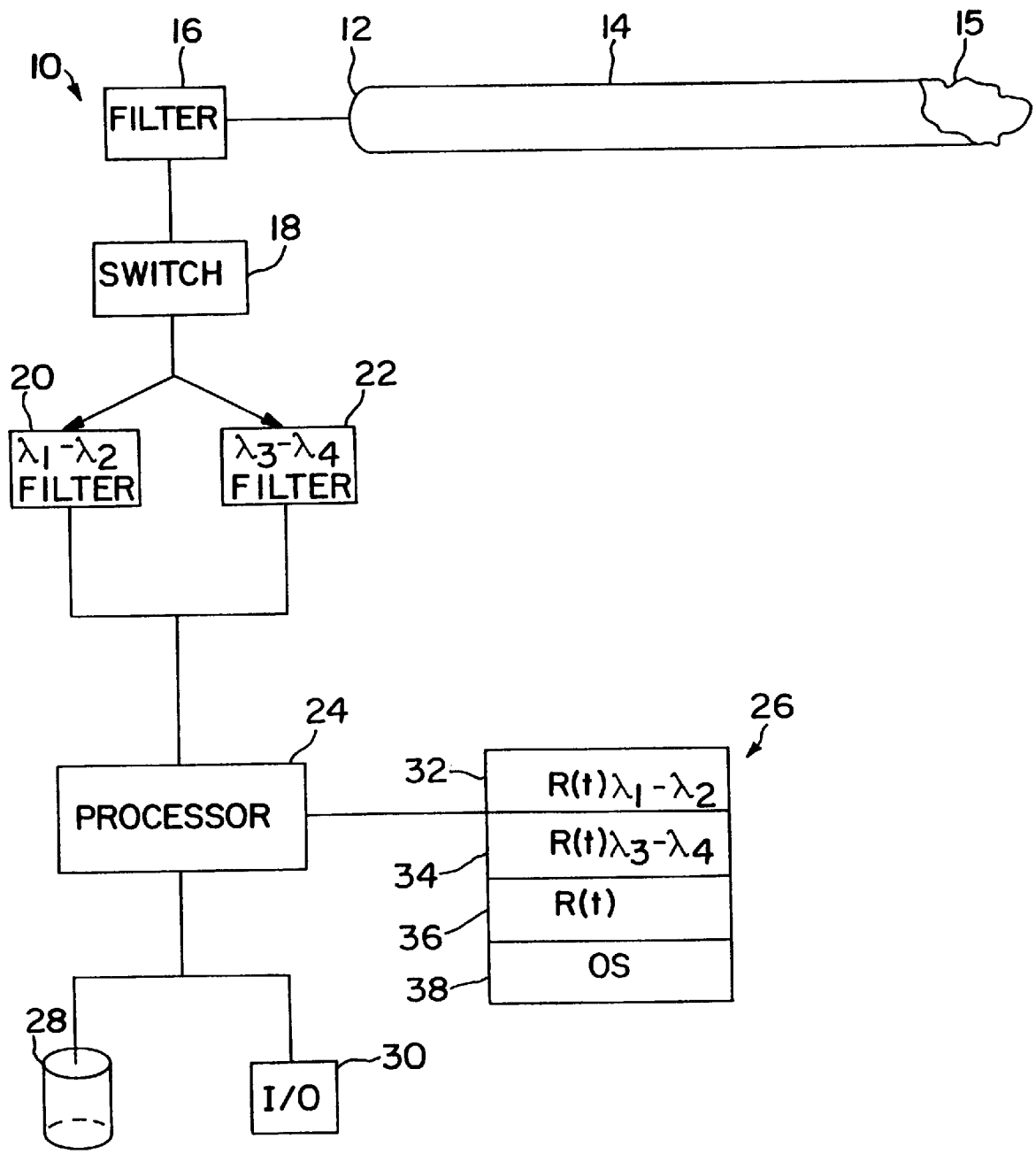
FIG. 3 is a block diagram of a first embodiment non-contact thermal measuring system for remote targets incorporating the principles of the present invention.

Turning to FIG. 3 a non-contact thermal measuring system 10 for measuring thermal power of a remote target 15 includes a collection apparatus such as an antenna 12 for collecting black-body radiation 14 from the target or object 15. The antenna provides an input to a conventional wavelength filter 16 which provides an output to a switch 18 to separate the output of the filter 16 into a first filter 20 for collecting the sum of the wavelengths and voltages in a first spectral region, $\gamma_1$–$\gamma_2$ and in a second wavelength filter 22 which provides a voltage output indicative of the wavelength in the spectral region $\gamma_3$, $\gamma_4$. The switch is under the control of a conventional processor 24.

The processor 24 includes a Random Access Memory (RAM) 26, a disk 28, and Input/Output (I/O) devices 30 for processing the input voltages using stored program instructions 32, 34 and 36 under the supervision of a conventional operating system 38. The stored program 32 executes an algorithm to perform the calculation defined by Equation 5 for $\gamma_1$, $\gamma_2$. The stored program instruction 34 performs the same calculation for $\gamma_3$, $\gamma_4$. The stored program 36 calculates the ratio of stored program 32 and 34 as defined by Equation 6. The algorithms may be implemented the stored programs by any programmer skilled in the art. The parameter values in Equation 6 and 8 are stored in the disk 28 and accessed by the program. The I/O devices 30 enable an operator to display the results of the calculation and change the characteristics of the filters 20 and 22 to select other spectral regions.

Figure 3A:
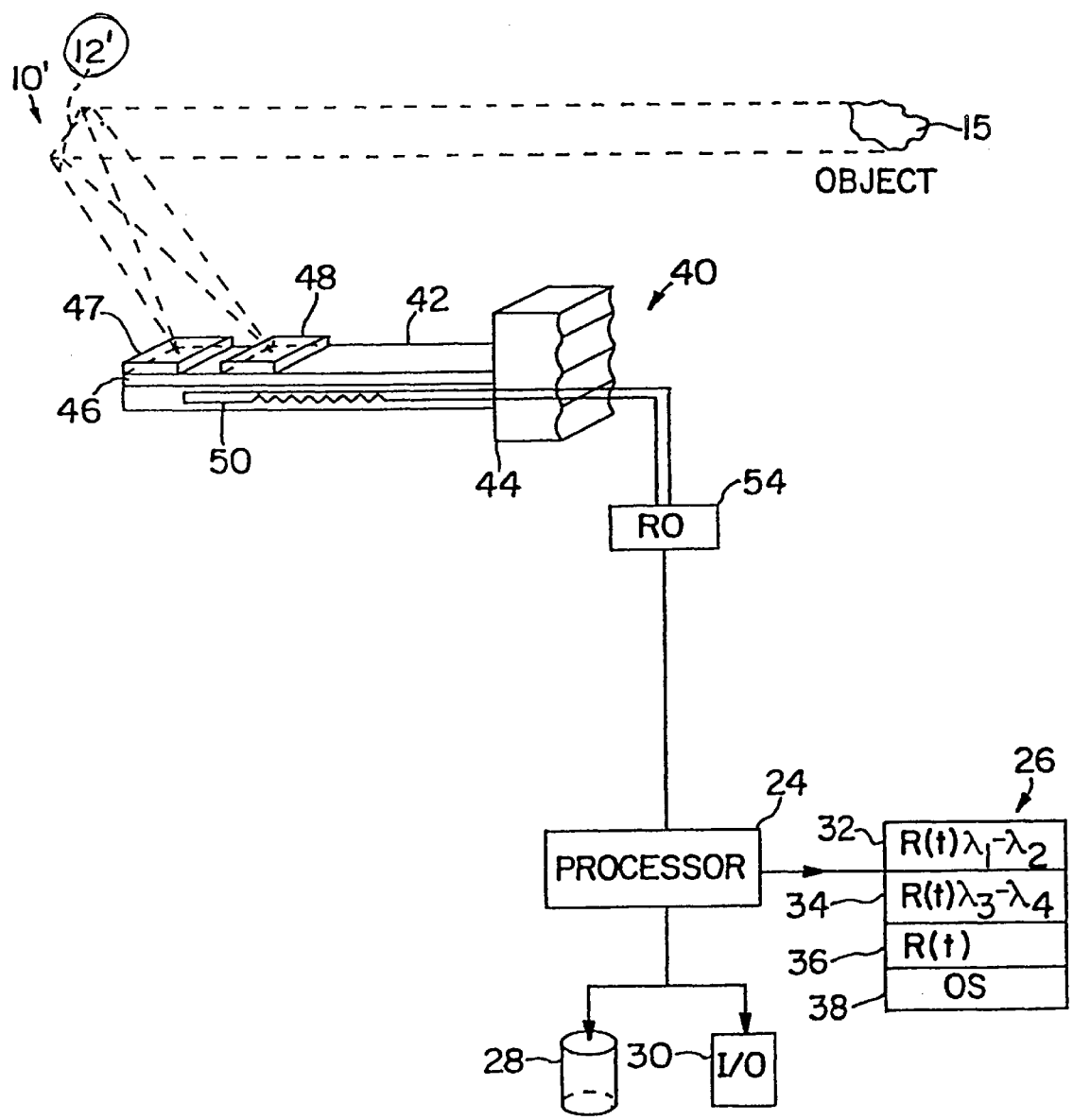
FIG. 3A is a block diagram of a second embodiment non-contact thermal measuring system for remote targets using a resistance micromechanical sensor for radiation measurement in different spectral infrared (IR) regions and incorporating the principles of the present invention.

A second embodiment 10' of a system incorporating the principles of the present invention is shown in FIG. 3A in which the radiation from the object 15 is collected by a rocking mirror 12' and directed to a micromechanical sensor 40 including a cantilever section 42 connected to a proximal section 44 by bimetallic member 46 formed on the section 44. Superimposed on the section 44, 46 are two radiation absorptive members 47 and 48. The member 47, such as a coating of material which is absorptive of wavelengths in the $\gamma_1$–$\gamma_2$ region. For example if GaAs is used as the material or coating the wavelengths region will extend from $\gamma_1$=0 $\mu$m to $\gamma_2$=0.89 $\mu$m. If Si or Ge are used as the material or coating the wavelengths regions will extend from $\gamma_1$=0 $\mu$m to $\gamma_2$=1.1 $\mu$m for Si and $\gamma_2$=1.82 $\mu$m for Ge. The member 48, such as a coating or material which is absorptive of wavelengths $\gamma_3$ to $\gamma_4$ region. For example, if InSb or HgCdTe are used as the material or coating the wavelength region will extend from $\gamma_3$=0 $\mu$m to $\gamma_4$=7 $\mu$m for InSb and $\gamma_4$=14 $\mu$m for HgCdTe. Furthermore, by using tertiary compounds (HgCdTe, InGaAs, etc) and varying the stoichiometry, the absorptive properties can be tailored to different and multiple wavelength regions. Alternatively, organic coatings can be used that absorb in distinct wavelength regions such as organic dyes.

A resistive circuit 50 is installed in the cantilever 42 and proximal section 44 and includes a resistor 52 which is connected to a resistance detector 54. When the rocking mirror 12', under the control of the processor 24, is directed to provide an output from the member 47, the resistance detector is set to read the movement change and resistance of the bimetallic element which change is indicative of the $\gamma_1$–$\gamma_2$ radiation. The detector 54 provides an output to the processor 24 which uses the stored programs in the memory 26 to calculate Equation 8, supra for $\gamma_1$–$\gamma_2$. When the rocking mirror 12' is directed to the member 48, the resistance detector provides a second output V$_d$ indicative of the voltage detected by the change in the metallic coating 46 for $\gamma_3$, $\gamma_4$. The output for $\gamma_3$, 65 $_4$ is provided to the processor 24 which calculates the Equation 8 for $\gamma_3$, $\gamma_4$. The ratio of stored programs is executed using the stored program 36 and the graph shown in FIG. 1 is constructed from which the temperature of the remote object 15 can be determined.

The micromechanical sensors may be in other embodiments for measuring black body spectral radiation of a target or object at different wavelengths using non-resistance measurements, as described in the previously filed application, Ser. No. 08/588,484, supra.

Figure 3B:
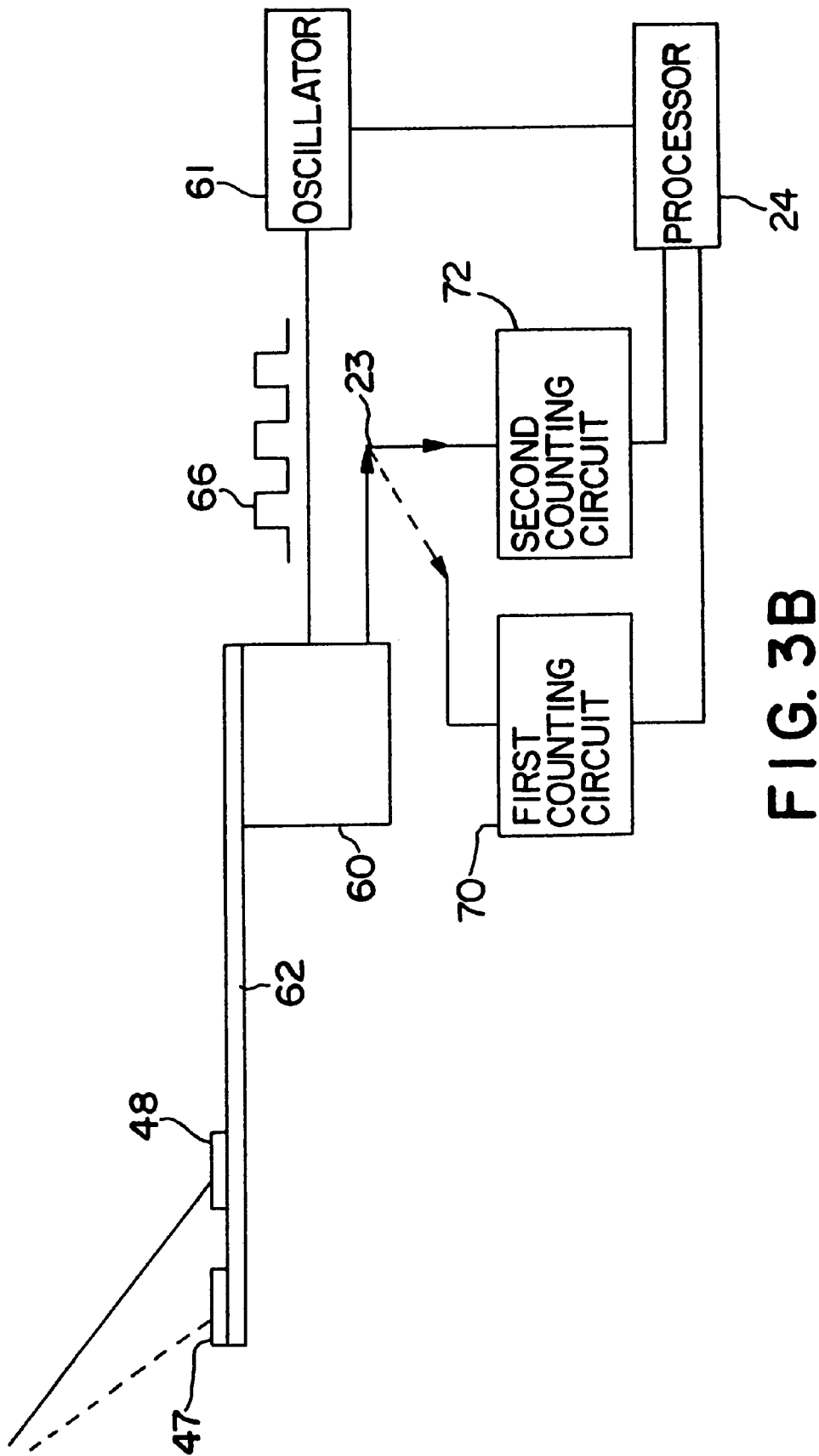
FIG. 3B is a block diagram of a third embodiment non-contact thermal measuring for remote targets using a frequency change micromechanical sensor for radiation measurement in different spectral regions and incorporating the principles of the present invention.
Figure 4A:
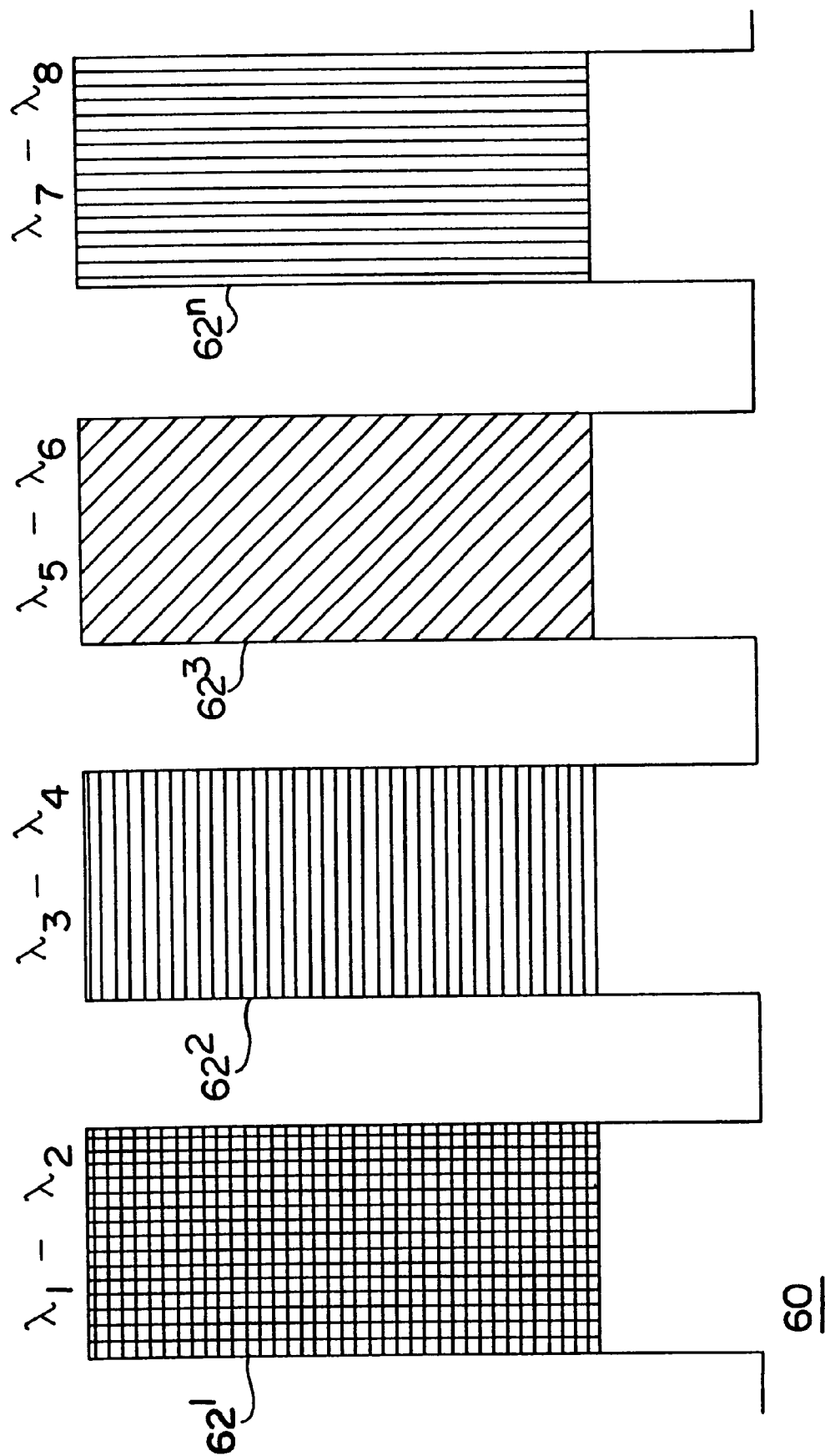
FIG. 4A is representation of an array of sensors in series for detecting different spectral regions of blackbody radiation from a remote object or target.

In FIG. 3B another embodiment for measuring temperature of a remote object includes a piezoelectric transducer 60 supporting an attached end of microcantilever 62 fabricated of quartz or silicon. A master oscillator 61 provides a drive signal 66 to the crystal 60 and the microcantilever 62 vibrates at a non-loaded resonance frequency. As radiation is absorbed by the elements 47 and 48 at different times which change their dimensions or mechanical properties due to the absorbed radiation resulting in changes in the resonant frequency of the crystal 60. A counting circuit 70 provides a changed resonant frequency for the crystal to the processor 24 due to the spectral absorptive qualities of the one material. A counting circuit 72 provides a changed resonant frequency to the processor due to the spectral absorptive qualities of the other material. The processor receives the output 66 from the oscillator 66 and determines the spectral radiations wavelengths based upon the changes in the resonant frequency for the crystal 60. The processor controls the switch 23 to separate the spectral wavelength information from one another. FIGS. 4A and B show alternative arrangements for aligning an array of sensors to collect thermal power from multiple spectral regions of a remote object. FIG. 4A shows an array of cantilevers, in series, each sensor on a cantilever responding to different wavelength by being composed of different material itself or having different coatings. The cantilevers respond to wavelength regions starting from the left cantilever array and proceeding to the right cantilever array. FIG. 4B shows a vertically stacked cantilever array where each cantilever responds to different wavelength regions as a consequence of being composed of different material or having different coating. A large number of cantilevers can be packed in a very small volume allowing multiple data point to be obtained for use in the determination of blackbody radiation and resulting temperature of a remote object.

Figure 2:
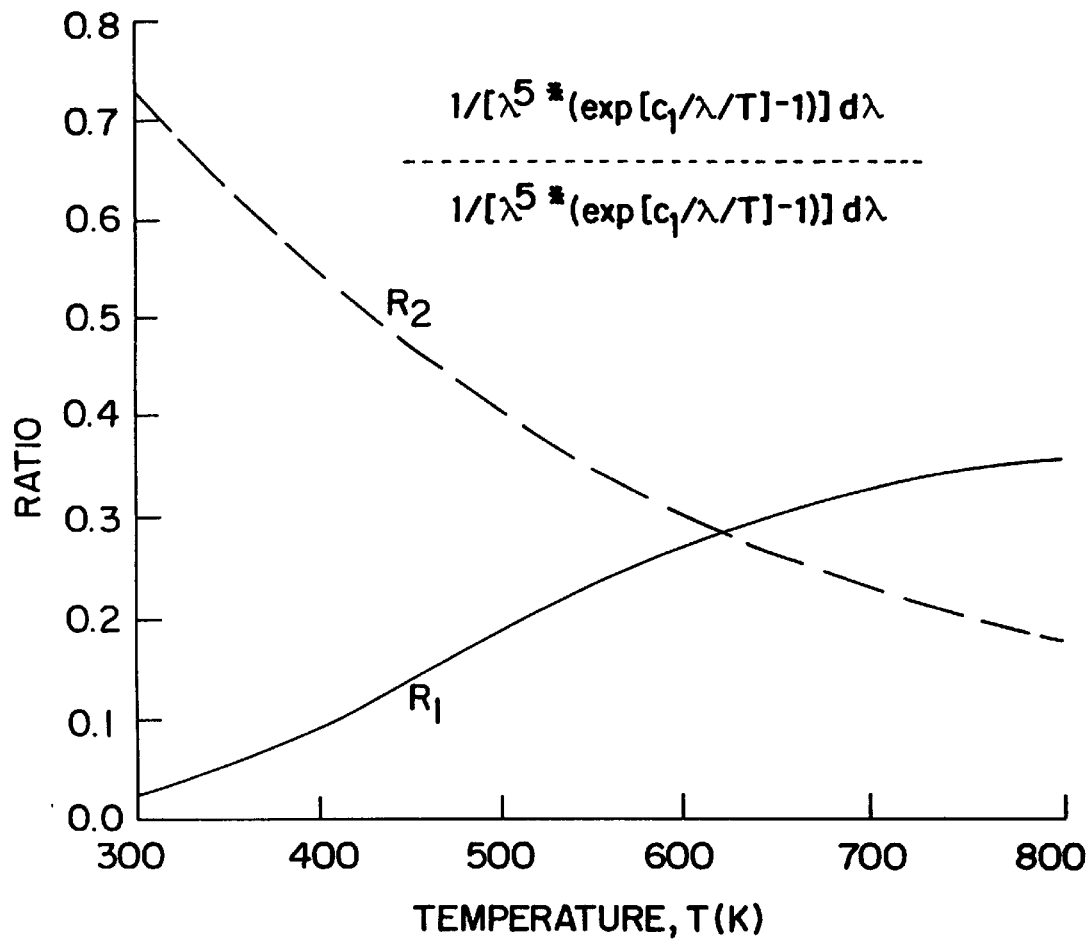
FIG. 2 is a temperature calibration curve measuring a ratio of the thermal power in two different spectral regions vs. temperature for a remote target.
Figure 5:
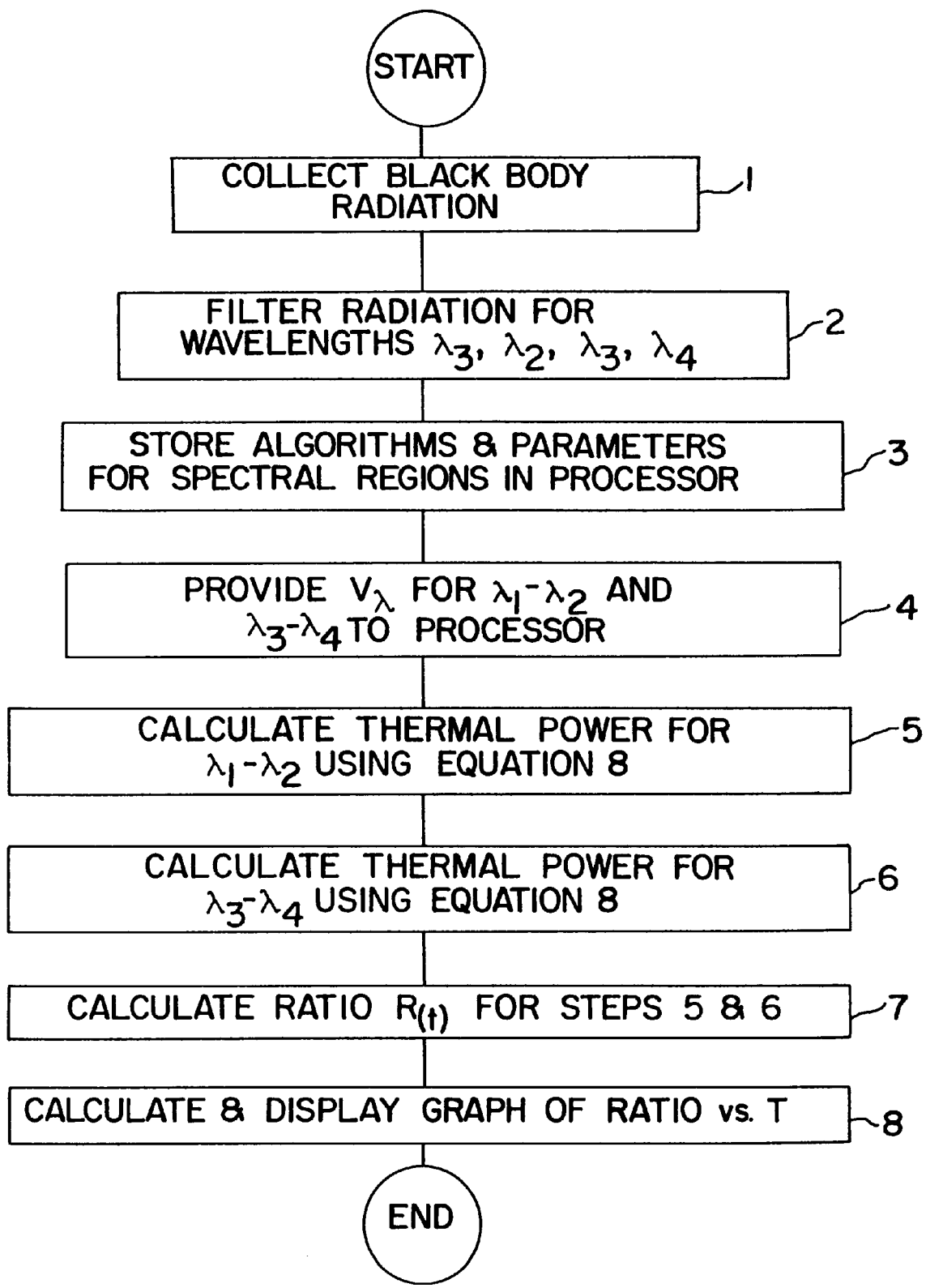
FIG. 5 is a flow diagram for processing black-body radiation from a remote target in the system of FIG. 3 or 3A, B and generating a temperature for the remote object using the calibration curve of FIG. 1 whereby the temperature is independent of target size, target distance, and emissivity of the remote target.

FIG. 5 describes a process for calculating the graph shown in FIG. 1 using the system of FIG. 2 or 3A, B, as follows:

In step 1, black-body radiation 14 of target 10 is collected by antenna 12 for temperature determination.

In step 2, wavelengths of the black-body radiation are identified in the filter 16.

In step 3, the program instructions for the algorithms 32, 34, 36 and parameters are loaded into the memory 26 of the processor 24.

In step 4, the filter 16 provides an output to a first filter 20 for selection of wavelengths in the spectral region $\gamma_1$–$\gamma_2$ or to a second filter 22 for selection of wavelengths in the spectral region $\gamma_3$–$\gamma_4$.

Step 5, the processor calculates the thermal power for the target using Equation 8 for the output of filter 20.

Step 6, the processor calculates the thermal power for the target using the output of the filter 22 and the Equation 8.

Step 7, the processor calculates the ratio of the thermal power for wavelengths $\gamma_1$–$\gamma_2$ and wavelengths $\gamma_3$–$\gamma_4$ using the Equation 9.

Step 8, the processor calculates and displays a graph of the ratio Rt as a function of temperature where $R_1$ is the ratio of the wavelength intensities through a 3–5 micrometer bandpass filter over a 0.8–14 micrometer bandpass filter and $R_2$ is the ratio of an 8–14 micrometer bandpass filter over a 0.8–14 micrometer bandpass filter. The output of the display enables the temperature of the remote target to be determined.

The filters 20 and 22 may be programmable by changing the RC circuits therein. The processor 24 may be adapted to change the settings on the filters 20, 22, thereby changing the black body radiation wavelengths for determination of temperature in spectral regions different than $\gamma_1$–$\gamma_2$ and $\gamma_3$–$\gamma_4$.

While the invention has been shown and described in connection with a preferred embodiment, various changes can be made therein without departing from the spirit and scope of the invention as defined in the appended claims.

We claim:

1. A non-contact passive infrared (IR) micromechanical thermometer for remote temperature measurement of a target, comprising:

a) collection means collecting and focusing incoming IR from the target on an IR detector;

b) a plurality of cantilevers made of different materials for absorbing radiation in different spectral regions due to blackbody radiation from the target;

c) said IR detector means measuring thermal energy of the target over a spectrum; and d) processor means for determining the target thermal energy in at least two different spectral regions; said processor means further determining the temperature of the target from calculating a ratio of the thermal power in the different spectral regions whereby the target temperature is independent of the target size, emissivity and distance to the detector.

2. A non-contact passive infrared (IR) thermometer for remote temperature measurement of a remote target, comprising:

a) a cantilevered spring element having a region treated with a material that absorbs a specified spectral region of infrared radiation and exhibits a physical change in response to absorbing the specified spectral region of infrared radiation;

b) collection means for collecting and directing at least a portion of the incoming IR from the target onto the treated region of the spring element;

c) deflection detection means for detecting a deflection of the cantilevered spring element due to bimaterial effect as the treated region of the spring element absorbs infrared radiation and exhibits the physical change; and d) processor means for determining the target thermal energy in at least two different spectral regions; said processor means further determining the temperature of the target from calculating a ratio of the thermal power in the different spectral regions, whereby the target temperature is independent of the target size, emissivity, and distance to the detector.

3. The non-contact thermometer of claim 2 wherein the cantilevered spring element comprises a first material having a first coefficient of thermal expansion and a second material having a second coefficient of thermal expansion, the first coefficient of thermal expansion and the second coefficient of thermal expansion being unequal.

4. The non-contact thermometer of claim 2 wherein the cantilevered spring element further comprises at least one region that specifically absorbs a region of black body radiation.

5. The non-contact thermometer of claim 2 wherein the deflection detection means comprises:

a) a laser emitting means for emitting a laser light beam; and b) a laser detecting means for detecting the laser light beam reflected from the end of the microcantilever, the laser emitting means being disposed to emit the laser light beam against the cantilevered spring element.

6. The non-contact thermometer of claim 2, wherein the deflection detection means comprises:

a) means for detecting at least one change in at least one electrical characteristic of the microcantilever.

7. The non-contact thermometer of claim 6, wherein said means for detecting at least one change in at least one electrical characteristic of the microcantilever comprises a means for detecting a change in at least one of piezoresistance, capacitance, and piezoelectricity.

8. Apparatus for non-contact remote temperature measurement of a target, comprising:

a) collection means collecting and focusing incoming infrared radiation (IR) from the target on an IR detector;

b) said IR detector means including a piezoelectric transducer having at least one cantilevered spring element secured thereto, said spring element having a first area coated with a first material having an affinity for IR in a first spectral region; said spring element having a second area coated with a second material having an affinity for IR in a second spectral region;

c) oscillator means for stimulating said transducer at or about a resonant vibrational frequency of said cantilevered spring and providing a first output vibrational frequency change indicative of the IR radiation in a first spectral region absorbed by the first material; said oscillator means providing a second output vibrational frequency change indicative of the IR radiation in a second spectral region absorbed by the second material;

d) processor means responsive to the first and second vibrational frequency changes for determining the target thermal energy in the two different spectral regions; and e) said processor means further determining the temperature of the target from calculating a ratio of the thermal power in the different spectral regions whereby the target temperature is independent of the target size, emissivity and distance to the detector.

9. A method for remote measurement of the temperature of a target independent of target size, target distance and emissivity, comprising the steps of:

a) collecting and focusing incoming IR from a target onto an IR detector means;

b) measuring thermal energy of the target over a spectrum using the IR detector means;

c) determining the target thermal energy in at least two different spectral regions; and d) determining the temperature of the target by calculating a ratio of the thermal power in the different spectral regions, whereby the target temperature is determined independent of the target size, emissivity and distance to the detector.

10. A method for determining temperature of a target independent of target size, target distance, and emissivity, comprising the steps of:

a) providing a cantilevered spring element having a structural secured to a piezoelectric transducer, said spring element having a surface coated in a first defined region with a radiation absorptive material in a first IR spectral range and coated in a second defined region with a radiation absorptive material in a second IR spectral range;

b) electrically driving said transducer at or near a resonance frequency of said spring element;

c) collecting and focusing incoming IR from the target on one of the first or second defined regions;

d) measuring changes in resonant frequency of the transducer due to the absorptive qualities of the radiation absorptive materials in the first and second defined regions;

e) determining the target thermal energy in at least two different spectral regions from the changes in resonant frequency of the transducer; and f) determining the temperature of the target by calculating a ratio of the thermal power in the different spectral regions, whereby the target temperature is determined independent of the target size, emissivity, and distance to the detector.

11. A non-contact infrared (IR) thermometer for remote temperature measurement of a remote target over a wavelength spectrum, comprising:

a) a microcantilever;

b) a first radiation absorptive member formed on the microcantilever and exhibiting a physical change when exposed to radiation over a first wavelength range;

c) a second radiation absorptive member formed on the microcantilever and exhibiting a physical change when exposed to radiation over a second wavelength range;

d) means for collecting and focusing IR radiation from a target onto each of the first and second radiation absorptive members;

e) means for generating sensor signals representative of physical changes in each of the first and second radiation absorptive members;

f) signal transducer means for translation of the sensor signals into binary form;

g) processing means providing an output by ratioing the sensor signals over two or more different wavelength bands; and h) means for determining the temperature of the target from the output of the processing means.

12. The non-contact thermometer of claim 11 further comprising a plurality of such microcantilevers.

13. The non-contact thermometer of claim 12 wherein the microcantilevers are in a juxtaposed relation.

14. The non-contact thermometer of claim 12 wherein the microcantilevers are in a stacked overlying relation.

15. The non-contact thermometer of claim 11, a) wherein said microcantilever comprises a bimetallic member formed thereon, b) wherein a physical property of the bimetallic member is changed in response to physical changes in each of the first and second radiation absorptive members; and c) wherein said means for generating sensor signals representative of physical changes in each of the first and second radiation absorptive members comprises a means for generating a sensor signal in response to a change in a physical property of the bimetallic member caused by a physical change in the radiation absorptive members.

16. The non-contact thermometer of claim 11, wherein the physical property of the bimetallic member which is changed in response to physical changes in each of the first and second radiation absorptive members is one or more of movement change and resistance.

* * * * *